Jan. 21, 1969   B. F. FEHLMAN   3,422,519
LINEUP CLAMP FOR PIPE

Filed Aug. 31, 1966   Sheet _1_ of 2

INVENTOR.
BARRY F. FEHLMAN

BY

*Head & Johnson*

ATTORNEYS

United States Patent Office 3,422,519
Patented Jan. 21, 1969

3,422,519
LINEUP CLAMP FOR PIPE
Barry F. Fehlman, 144 Thomas Jefferson Drive,
San Antonio, Tex. 78228
Filed Aug. 31, 1966, Ser. No. 576,466
U.S. Cl. 29—200                                4 Claims
Int. Cl. B23p 19/02; B25b 1/08; B25b 5/08

This invention has for its primary object the provision of a portable lineup clamp for alignment of abutting sections of pipe prior to welding.

More particularly, this invention provides a portable lineup clamp which is readily adaptable about two abutting sections of pipe and is particularly adaptable to thin walled pipe. In addition this invention provides a high leverage clamp retaining means which is adaptable to align adjacent and abutting pipe ends for the purposes of preliminarily tacking the sections together prior to a full circumferential welding process.

It is a still further object of this invention to provide a lineup clamp which is adaptable for use with abutting sections of pipe and/or fittings one of which may be of larger exterior diameter than its adjacent section of pipe.

These and other objects of this invention will become more apparent upon further reading of the specification of the claims when taken in conjunction with the illustrations of which:

Figure 1:
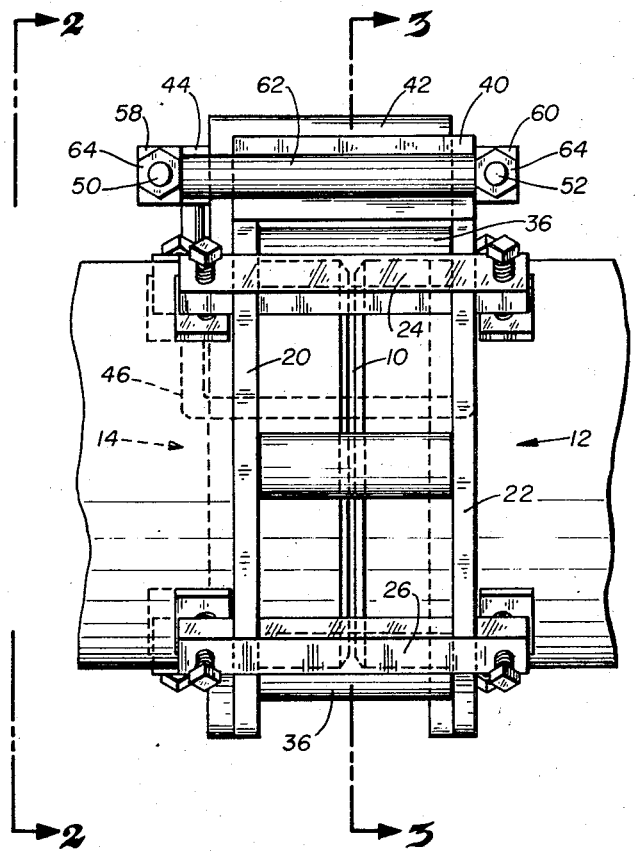
FIGURE 1 is a front elevational view depicting this invention.

Referring now to the drawings the clamp is shown straddling pipe joint 10 which is to be welded. The clamp includes generally first and second arcuate portions 12 and 14 respectively, which portions, although offset, are substantially identical and pivotal about shafts 16 and 18. The first arcuate portion 12 includes substantially parallel arcuate members 20 and 22 which are interconnected and rigidly retained by outer cross braces or pieces 24 and 26. These cross braces extend longitudinally beyond at least one of the arcuate members 20 or 22 and include in connection therewith threaded bolts 28 and 30, respectively. Each of the threaded bolts terminates adjacent the pipe with an arcuate segment 32 and 34 connected thereto as by a ball and socket for usage as will be hereinafter described. A plurality of rollers 36 extend likewise between the parallel arcuate members 20 and 22 and are supported upon shafts 38. The rollers 36 are so adapted to extend across the pipe joint 10 as shown. Shaft 38 extends between and interconnects members 20 and 22 and in one embodiment are sufficient to provide lateral strength to the two members without the use of cross braces 24 and 26, although provision is made to provide an extension for bolts 28 and 30 and that embodiment of this invention. The upper part of arcuate portion 12 includes a semi-circular segment 40 which extends across and interconnects parallel arcuate members 20 and 22. The second arcuate portion 14 is similarly constructed to portion 12 and like parts are shown and described with like numerals. Integral with the upper portion of second arcuate portion 14 is a sleeve 42 extending across and interconnecting the parallel arcuate members in this instance identified as 21 and 23. Rotatable therein is a shaft 44 which includes a U-shaped bail or handle member 46. Pivotally attached off-center to the ends of shaft 44 at point 48 are the legs of a U-shaped yoke element 50 on one side, and 52 on the other, each of which terminates with threads 54 and 56 respectively. Sleeves 58 and 60 respectively of the yoke member include a transverse bight portion or bar 62 which is adapted to fit semi-circular segment 40. The sleeves 58 and 60 and hence transverse bar 62 are adjustably retained upon their respective yoke threads by bolts 64.

Figure 2:
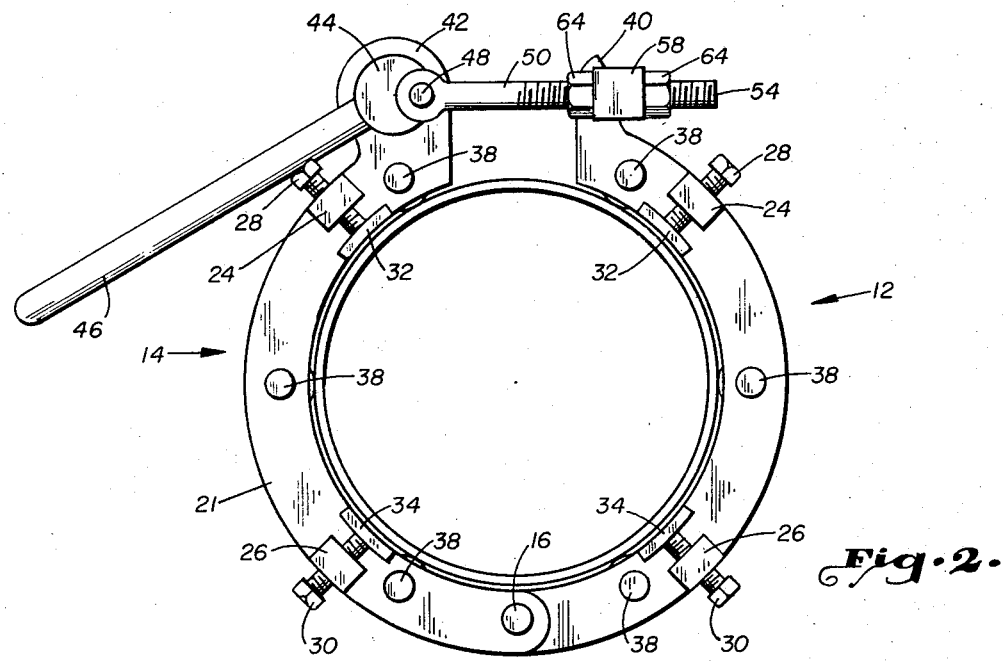
FIGURE 2 is an elevational view of the clamp of this invention when taken along the line 2—2 of FIGURE 1.
Figure 3:
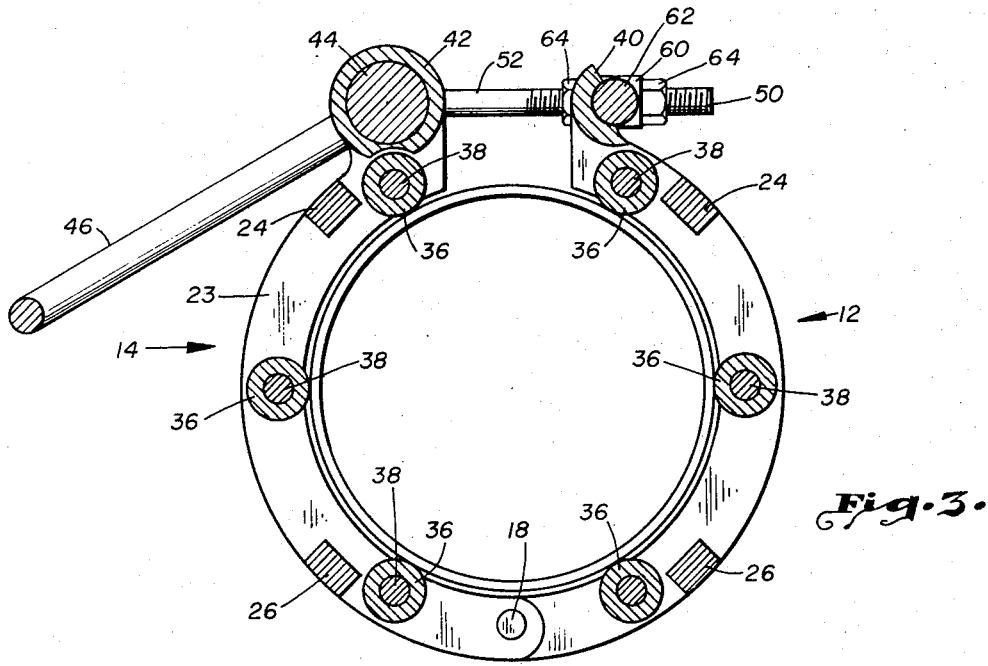
FIGURE 3 is a sectional view of the lineup clamp of this invention as taken along the line 3—3 of FIGURE 1.

In normal usage the first and second arcuate portions 12 and 14 normally are pivoted open about their pivot pins 16 and 18 so as to be placed about a pipe straddling pipe joint 10, which in ordinary circumstances is two pieces of pipe beveled or otherwise ready for a welding connection. Handle 46 is positioned such that yoke members 50 and 52 are in their forwardmost position in order that transverse bar 62 may be positioned over the semi-circular element 40. If this is not the case appropriate adjustment is made using nuts 64 and repositioning sleeves 58 and 60. Rotative movement of the handle 46 has, for example in a clockwise direction as shown in FIGURES 2 and 3, a clamping action forcing the first and second arcuate portions 12 and 14 toward each other. As such, roller elements 36 make roller contact with the pipe which is adapted to move therewith without causing any indentations or other stress weakening to the pipe. Rotation of the handle continues until an off-center relationship is reached and the lineup clamp becomes rigidly affixed to abutting sections of pipe. Thereafter a welder operating through the open spaces between cross bars 24 and 26 and/or rollers 36 will tack weld the pipe various places around the circumference of the joint. Thereafter the handle 46 is rotated in a counterclockwise direction releasing the yoke and transverse bar portion from first arcuate portion 12 for use again. Thereafter a welder will finish the welding operation by completing a circumferential weld in the now lined up pipe.

There are instances where appropriate lineup is to be made between adjacent fittings or pipe wherein the exterior diameter (O.D.), of one part is greater than the O.D. of the other. In that instance, that side of the lineup clamp of this invention, as shown in FIGURE 2, having the threaded bolts and arcuate sections, is positioned such that arcuate segments 32 and 34 are aligned across the joint and upon the adjacent fitting or pipe. The clamp is set as previously described. Using an appropriate wrench, bolts 28 and 30 are tightened until the arcuate portion is in snug contact with the larger O.D. portion. Adjustment is made to centralize the fitting to the pipe. Thereafter the welder will tack weld the joint as heretofore described.

The invention has been described to specific and preferred embodiments. It will be apparent, however, that other modifications can be made without departing from the spirit and scope of the invention. Accordingly this invention should be construed not to be limited to the embodiment herein described but should be limited only by the scope of the appended claims.

What is claimed:
1. An abutting pipe lineup clamp comprising
   first and second hingeably connected arcuate portions
      each comprising
   parallel arcuate members supported by longitudinal crossbars, and
   a plurality of longitudinal rollers supported by said pipe when said arcuate portions are circumferentially clamped about said pipe joint,
   a semi-circular segment across said members at the unhinged end of said first segment and facing outward therefrom,
   a sleeve across said members at the unhinged end of said second segment and including a rotatable shaft therein, a handle attached to said shaft,
   a U-shaped yoke element, the free ends of which are pivotally attached to the ends of said sleeve off-center therefrom, the bight portion of said element adaptable to be received over and into said semi-circular segment whereby rotative movement of said handle will cause said arcuate portions to clamp about said pipe joint and align same for welding.

2. A clamp according to claim 1 wherein said rollers are supported about said crossbars.

3. A clamp according to claim 1 wherein said U-shaped yoke element includes a transverse bar forming said bight portion and adjustably attached yoke elements for said leg portions.

4. A clamp according to claim 1 wherein each of said crossbars extend slightly beyond one side of said arcuate portions and include a threaded bolt and arcuate segment adapted to be adjusted radially relative to said pipe or fitting.

References Cited

UNITED STATES PATENTS

| | | | |
|---|---|---|---|
| 2,325,417 | 7/1943 | Merrill et al. | 269—229 X |
| 2,888,895 | 6/1959 | Coody et al. | 269—201 |
| 3,284,883 | 11/1966 | Haverfield et al. | 29—200 |

THOMAS H. EAGER, *Primary Examiner.*

U.S. Cl. X.R.

269—201, 229